United States Patent [19]
Burcham

[11] 3,731,950
[45] May 8, 1973

[54] ADJUSTABLE LOAD STABILIZING TRAILER HITCH

[75] Inventor: Harry Logan Burcham, Lodi, Calif.

[73] Assignee: Valley Tow-Rite, Inc., Lodi, Calif.

[22] Filed: Aug. 4, 1971

[21] Appl. No.: 168,874

[52] U.S. Cl. ............................................. 280/406 A
[51] Int. Cl. ............................................. B60d 1/06
[58] Field of Search ................................... 280/406 A

[56] References Cited

UNITED STATES PATENTS

| 3,194,584 | 7/1965 | Reese | 280/406 A |
| 2,952,475 | 9/1960 | Reese | 280/406 A |
| 2,597,657 | 5/1952 | Mathisen | 280/406 A |
| 3,490,788 | 1/1970 | Mann | 280/406 A |
| 3,206,224 | 9/1965 | Bock et al. | 280/406 A |
| 3,403,928 | 10/1968 | Laughlin | 280/406 A |

*Primary Examiner*—Leo Friaglia
*Attorney*—Townsend & Townsend

[57] ABSTRACT

An adjustable load stabilizing trailer hitch of the type having a pair of tapered elongate spring bars pivotally mounted on either side of the ball mount. The spring bars have camming members mounted at their free ends for engagement with vertically adjustable cam supports. The camming members and cam supports acting together increase flexure of the spring bars to resist swaying of the trailer. The mounted ends of the spring bars are inherently designed for locking the bars in position into the ball mount.

3 Claims, 8 Drawing Figures

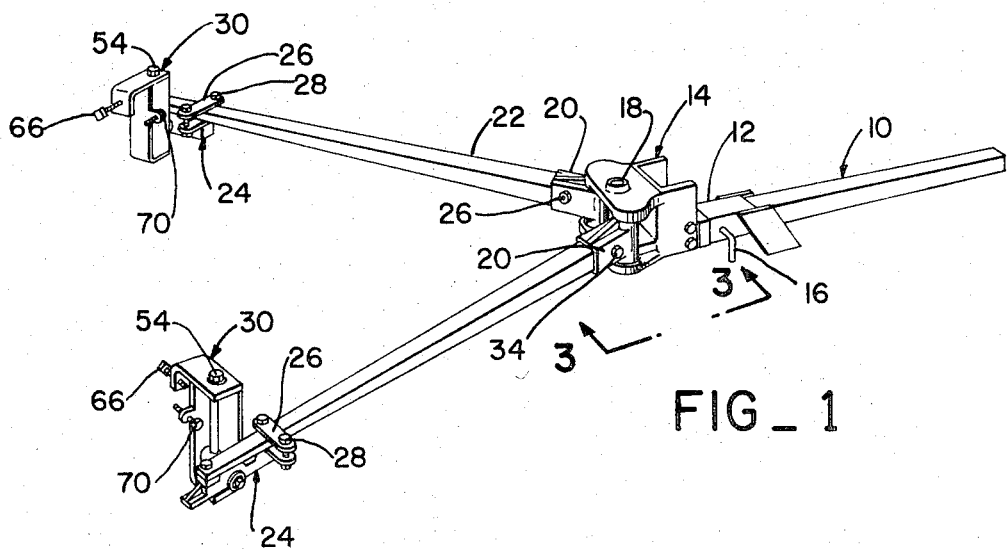
FIG_1
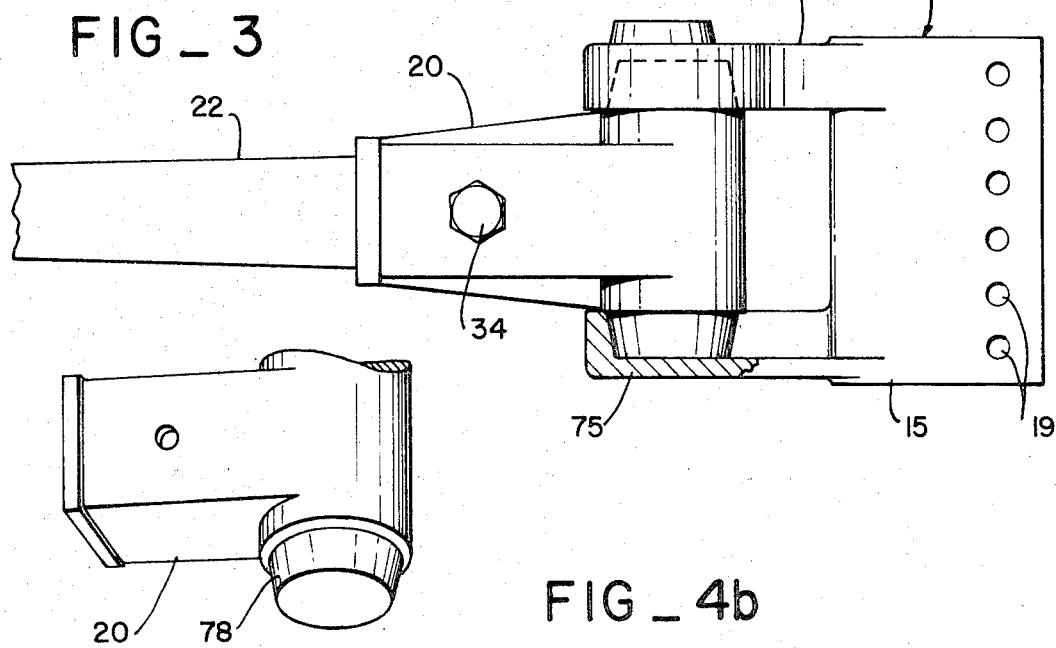
FIG_3
FIG_4b
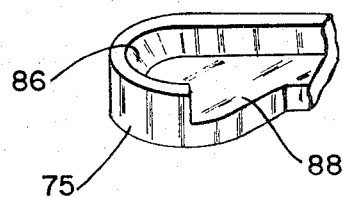
FIG_4a
INVENTOR.
HARRY L. BURCHAM
BY
Townsend and Townsend
ATTORNEYS

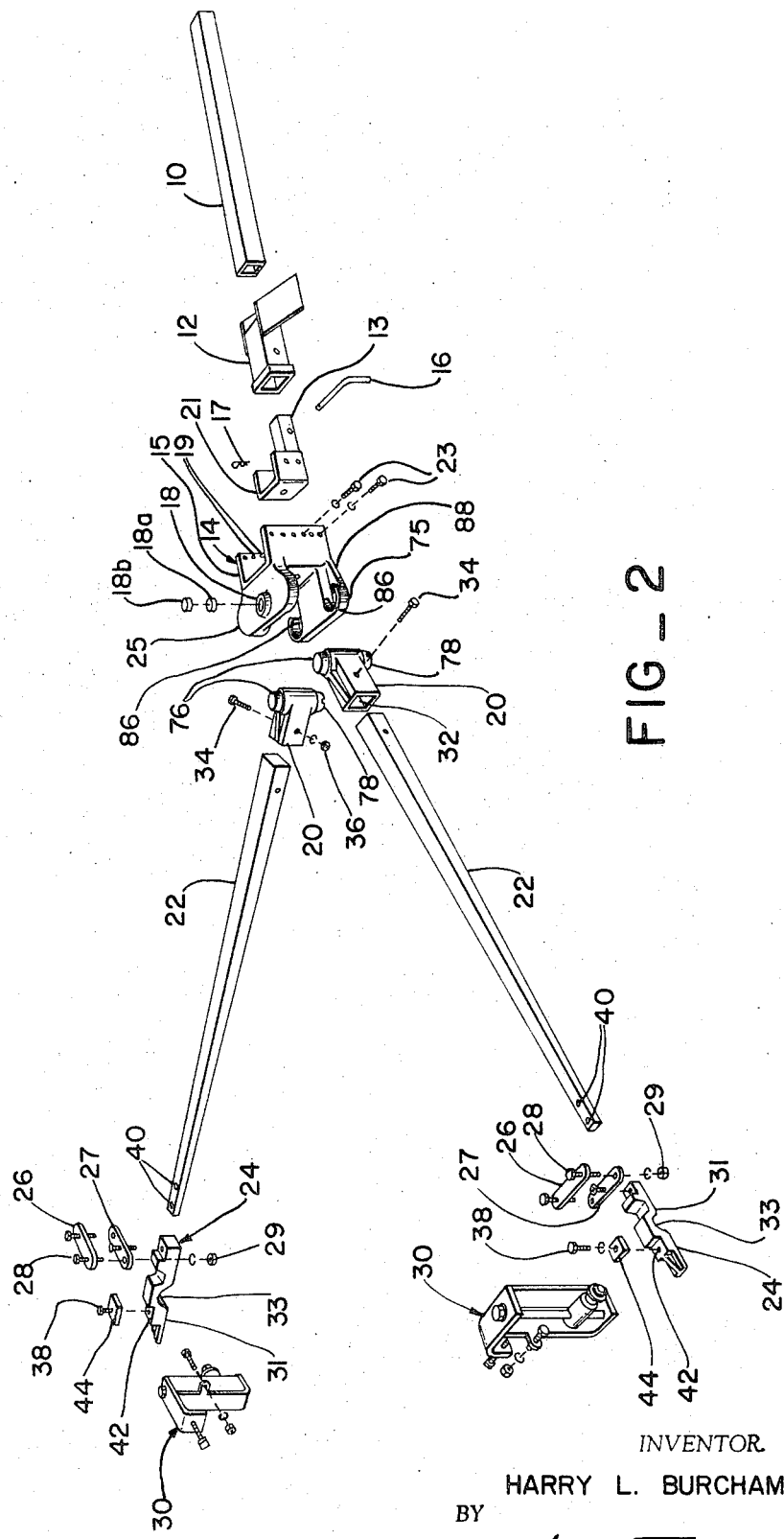

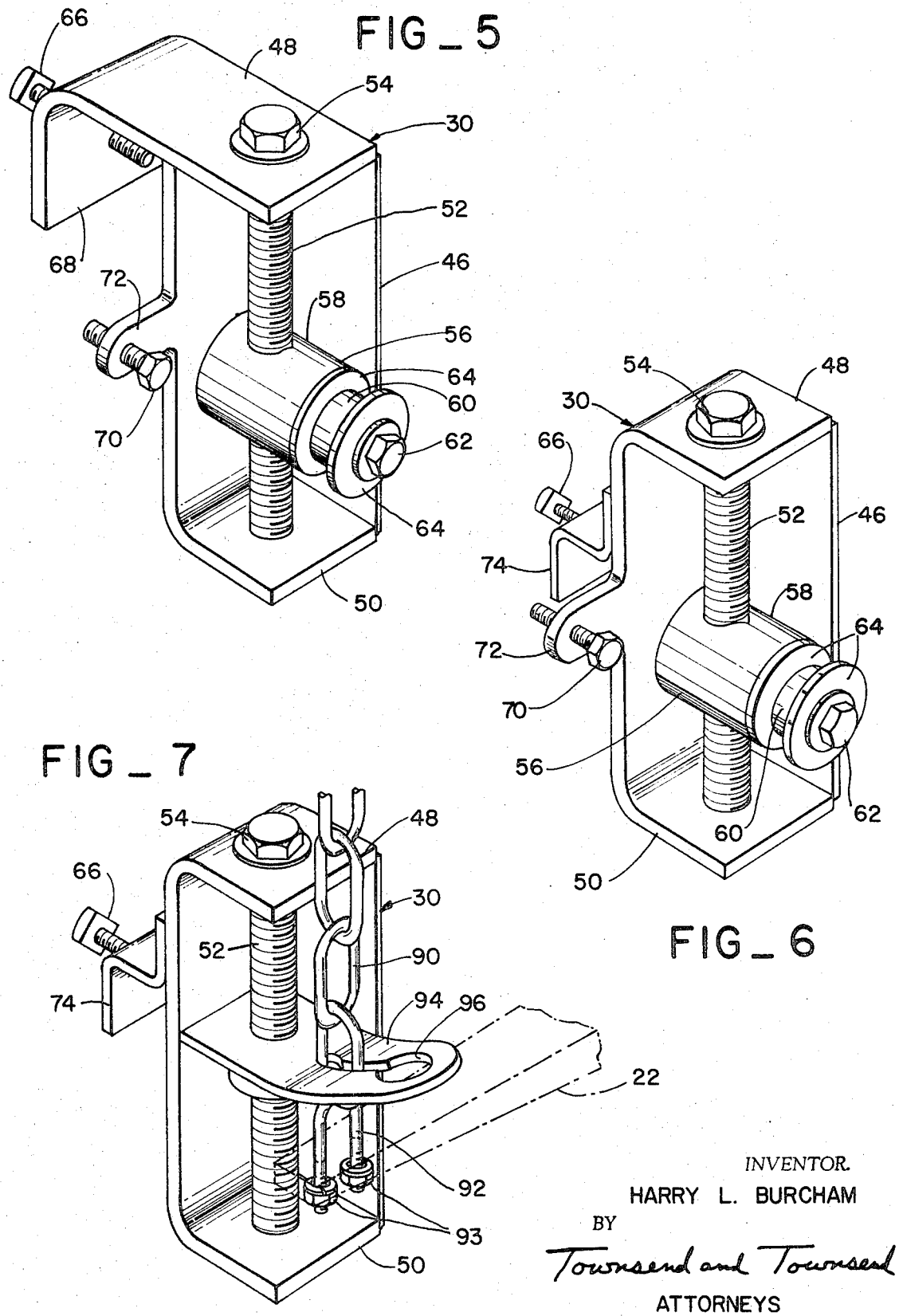

ADJUSTABLE LOAD STABILIZING TRAILER HITCH

This invention relates to trailer hitches and, more particularly to an improved adjustable load stabilizing trailer hitch.

Trailer hitches, and in particular load stabilizing trailer hitches have become well known in recent years. Load stabilizing trailer hitches are characterized by a form of camming action which increases the effect of the loading on the spring bars in order to resist the tendency of a towed trailer to sway violently from the effects of wind and relative motion between the towed trailer and large highway vehicles.

The present invention is an improvement over the load stabilizing trailer hitch claimed in U. S. Pat. No. 3,520,556 assigned to the same assignee as the present invention. This new design embodies improvements which permit even closer control over the amount of leveling load and permit the use of the hitch with surge brakes which have begun to be far more widely used.

The adjustable load stabilizing trailer hitch of the present invention includes tapered spring bars with socket assemblies for mounting heads removably affixed at the larger end. Each mounting head is formed with bearing bosses to provide substantial load bearing surfaces for the spring bars. The bottom of the load bearing boss has a counterbore therein for accepting a complementary projection in the ball mount so that the spring bars are securely locked in place.

The present invention also includes camming members affixed to the free ends of the spring bars for action in conjunction with cam rollers mounted on vertically adjustable screws to permit the optimum load leveling result when a loaded trailer is attached to the towing vehicle.

In the drawings:

FIG. 1 is a perspective view of the load stabilizing hitch of the present invention;

FIG. 2 is an exploded perspective view of the load stabilizing hitch shown in FIG. 1;

FIG. 3 is an enlarged view in partial section of the hitch and spring bar connection taken along line 3—3 of FIG. 2;

FIG. 4a is a fragmentary perspective view of the socket area of the lower flange of the ball mount frame;

FIG. 4b is an enlarged perspective of the end of the spring bar showing the locking bosses and sockets;

FIG. 5 is a perspective view of one form of screw-operated leveler which supports the spring bars of the hitch;

FIG. 6 is a variation of the screw-operated leveler as used with surge brakes; and FIG. 7 is still another variation for utilizing the tow leveling characteristics only of the present trailer hitch.

Referring now more particularly to the drawings in which the same numerals refer to identical parts in each of the several views, the load stabilizing hitch of the present invention is shown generally in FIG. 1 and in exploded view in FIG. 2. The hitch is connected to the motor vehicle through the tow bar 10 which is welded or bolted to the towing vehicle. At the rear of the tow bar is the receiver 12 which is rigidly affixed to the tow bar 10. The receiver is hollow and receives a complementary plug 13 therein. The ball mount frame 14 is bolted to the end of the plug 13 to project rearward from the vehicle for carrying the trailer and the spring bar assemblies. A pull pin 16 passes through the side wall of the receiver 12 and through the plug 13 to hold the plug in place and to permit easy removal after towing. A spring clip 17 which is inserted into a hole in the end of the pull pin secures the pin in place.

The ball mount frame 14 is formed with a pair of vertical, spaced apart walls 15 having a vertical row of bolt holes 19 adjacent the end of each. The plug 13 is provided with a channel shaped section 21 welded to the end of the plug and fitting between the spaced apart walls 15 of the ball mount frame. The channel section is also drilled, although with fewer vertical holes, so that the frame 14 is vertically adjustable with respect to the tow bar in order to accommodate varying loads and varying trailer tongue weights. Bolts 23 pass through the holes 19 in the frame walls and through the holes in the channel section 21 to secure the ball mount frame 14 to the towing vehicle. A conventional ball mount (not shown) may be bolted in place in the ball mount bore 18 in the upper horizontal flange 25 of the ball mount frame. Inserts 18a and 18b may be utilized in the bore 18 to accommodate various shank dimensions on the ball mounts.

The spring bars 22 are elongate tapered spring steel bars approximately square at the large end which fit into square sockets 32 in the spring bar mounting heads 20. Bolts 34 and nuts 36 passing through the walls of the sockets 32 and the ends of the bars 22 secure the bars to the mounting heads. Mounted at the tapered ends of the spring bars are the cam assemblies 24 which actuate the spring bars for leveling and stabilizing a towed load.

The cam assemblies 24 comprise a cam block 31 bolted to the narrow end of the spring bar 22 by means of a pair of clamp plates 26 and 27 above and below the end of the bar 22, fastened together by means of bolts 34 and nuts 36, and also by means of a bolt 38 which passes through a hole 40 in the end of the bar and is screwed into a threaded hole 42 in the cam block. A spacer 44 between the underside of the bar and the block 31 permits tightening the block securely to the bar end.

The screw operated levelers 30 are of generally similar construction with the exceptions to be noted. The levelers comprise a heavy metal body 46 having upper 48 and lower (50) flanges disposed horizontally. A vertical threaded shaft 52 is disposed between the upper and lower flanges, passing through the upper flange so that its hexagonal head 54 is located on the top of the upper flange 48 to permit turning the shaft to move the roller support 56 upward and downward. The roller support comprises a carrier 58 having a threaded bore into which the shaft 52 fits. A cam roller 60 is fastened at the outer end of the carrier by means of a bolt 62 and guide washers 64. When the stabilizing hitch is in operation, the cam assembly 24 fits between the guide washers 64 thus precluding side movement of the spring bars while the cam notch 33 rides on the cam roller 60.

The levelers 30 also include clamping arrangements for fastening the levelers to the trailer tongue frame members. As shown in FIG. 5, the frame clamps comprise a bolt 66 treadedly engaged in a depending portion 68 of the upper flange 48. A bolt 70 threadedly engaged in a projection 72 of the body 46 serves to clamp the frame from the opposite side as well. An alternative clamping arrangement is shown in FIGS. 6 and 7; the leveler in FIG. 6 having a shaped strap 74 welded to the back of the leveler body 46, but carrying the threadedly engaged bolt 66 in the same general manner, while the leveler in FIG. 7 is lacking the supplemental clamp formed by the projection 72 in the other levelers shown.

The leveler 30 shown in FIG. 6 is used with surge brakes (not separately shown) connected to the trailer tongue. When surge brakes are thus connected, the tongue is extended somewhat thus changing the angle at which the spring bar assemblies extend back toward the tongue frame members. In order to accommodate the changed angle, the roller support member 56 is mounted at angle 8° from a line perpendicular to the trailer frame. The 8° change in angle is back toward the rear of the trailer so that the spring bar cam assembly 24 rides smoothly on the cam roller 60.

Since the addition of a surge brake to the trailer also raises the level of the trailer mount, the leveler illustrated in FIG. 6 has its mounting strap 74 located lower down on the body 46 so that the leveler rides higher on the trailer tongue. One further difference in the surge brake load stabilizing hitch is worthy of note. The cam assembly 24 utilized with the surge brake hitch requires a cam block 31 having an elongate cam notch 33. The notch 33 for use with surge brakes is approximately one-half inch longer than those on the conventionally equipped trailer tongues so that there may be one-half inch of movement forward by the trailer when the towing vehicle begins to brake. This one-half inch forward movement permits surge brakes to be actuated, which would not be feasible without the one-half inch additional opening in the cam notch 33.

The leveler shown in FIG. 7 is used for conventional load leveling utilizing essentially the same basic parts as the load stabilizing hitches previously described. Instead of a cam assembly, a chain 90 is connected to the end of the spring bar 22 by means of a U-bolt 92 and nuts 93. The leveler has a retainer bracket 94 threadedly mounted on the vertical threaded shaft 52. The retainer bracket has a key-hole slot 96 formed in the center to permit the chain 90 to be inserted therein and turned to lock it in place. This gives a gross adjustment which is then refined by rotating the threaded shaft to move the bracket 94 up and down in order to stress the spring bars 22 to the desired amount.

One of the features of the present invention lies in the unique locking arrangement for the spring bar mounting heads. The heads 20 have upper and lower bearing surfaces 76 and 78 which are secured in the ball mount frame 14 between the upper flange 25 and the lower flange 75. The lower bearing surface 78 of the mounting head has an inherent design so in all normal operating angles due to towing vehicle turning, and trailer following, the bars are securely held into lower flange 75.

The lower flange 75 of the ball mount frame 14 has a pair of sockets 86 formed in the face thereof to accept the lower bearing surfaces 78 of the spring bar mounting heads. Similar sockets are formed in the upper flange 25 of the frame to accept the upper bearing surface 76 of the mounting heads. An elongate projection 88 is formed at the bottom of each of the flange sockets 86, with its elongate axis aligned approximately with the elongate axis of the towing vehicle. The length of the projection 88 is slightly longer than the diameter of the socket 86 so that the spring bar assemblies may pivot freely within the ball mount frame 14. Because the socket is designed to permit the spring bar mounting head to be moved into position across the projection when the spring bar is approximately at right angles to the elongate axis of the towing vehicle, turning the bars 90° toward the rear of the vehicle will prevent the bars from moving sideways. Thus, the bars are retained within the frame although free to pivot as the towing vehicle turns during driving or backing into parking spots.

The procedure for hooking up the trailer hitch of the present invention is extremely simple. The ball mount frame 14 which is normally bolted to the plug 13 is connected to the tow bar by inserting the plug 13 into the receiver 12. Inserting the pull pin 16 through the interconnected plug and receiver locks the ball mount in place. The spring bars 22 are connected to the ball mount frame by holding the bars approximately 90° to the tow bar axis, inserting the bearing surface 86 into upper flange 25, allowing bearing surface 78 to enter lower flange sockets 86, and then pivoting the bars back toward the trailer to lock the arm 22 within the walls of the socket 86 formed in the lower bearing surface 75 of the mounting head.

The levelers 30 are clamped to the frame members of the trailer tongue in the general position shown in FIG. 1. By utilizing a suitable wrench on the hex head 54 of the threaded shaft 52, the roller support member 56 may be fully lowered to permit the notch 33 of the cam assembly 24 to be engaged with the cam roller 60. The wrench may then be used to raise the roller support member to properly stress the spring bars level with the trailer and the towing vehicle.

The action of the cam assembly in conjunction with the cam roller tends to resist swaying and rocking of the trailer. When the towing vehicle makes a turn, the spring bars move relative to the levelers, the bar on the inside of the turn moving backward relative to the leveler and the bar on the outside of the turn moving forward. The cam assemblies move out of contact with the rollers thus stressing the spring bars and increasing the loading on the bars. The increased downward force on the bars tends to force the trailer back to level ride. The centering effect of the notch engaged with the cam roller also tends to force the trailer to maintain a straight line path while being towed.

While one embodiment of the invention has been shown and described, it will be obvious that other adaptations and modifications can be made without departing from the true spirit and scope of the invention.

I claim:

1. In a load stabilizing hitch for connecting trailers having a forwardly extending tongue with a towing vehicle, said hitch being of the type in which a spring bar assembly is pivotally mounted to a ball carrying bracket, said spring bar assembly comprising an elongate, tapered, resilient bar, a mounting head adapted to receive one end of the resilient bar therein, means for locking the resilient bar in the mounting head, said mounting head having upper and lower bearing surfaces for engaging the ball carrying bracket, a leveling device affixed to the trailer tongue frame, said leveling device in cluding a vertical threaded shaft, a roller member carried on said shaft for vertical movement when the shaft is rotated, said roller member disposed to engage a cam member fastened to the smaller end of the resilient bar for stabilizing and leveling the trailer.

2. In a load stabilizing hitch for connecting trailers having a forwardly extending tongue with a towing vehicle, said hitch being of the type in which a spring bar assembly is pivotally mounted to a ball carrying bracket, said spring bar assembly comprising an elongate, tapered, resilient bar, a mounting head adapted to receive one end of the resilient bar therein, means for locking the resilient bar in the mounting head, said mounting head having upper and lower bearing surfaces for engaging the ball carrying bracket, and including cam means attached to the smaller end of the resilient bar, said cam means having a notch for engagement with a roller member mounted on the trailer tongue for stressing said spring bars when the towing vehicle and a trailer change direction, and wherein the notch is elongate so that there may be relative movement between the resilient bar and the trailer tongue before the spring bar is stressed by action of the roller actuating the cam.

3. The load stabilizing hitch of claim 2 wherein the relative movement between the resilient bar and the trailer tongue is approximately one-half inch.

* * * * *